(12) United States Patent
Rusu

(10) Patent No.: US 11,749,031 B1
(45) Date of Patent: Sep. 5, 2023

(54) REMOTE VEHICLE DIAGNOSTIC AND PROGRAMMING SYSTEM

(71) Applicant: EGR Solutions, LLC, Loganville, GA (US)

(72) Inventor: Emanuel Rusu, Loganville, GA (US)

(73) Assignee: EGR Solutions LLC, Loganville, GA (US)

( * ) Notice: Subject to any disclaimer, the term of this patent is extended or adjusted under 35 U.S.C. 154(b) by 197 days.

(21) Appl. No.: 16/440,981

(22) Filed: Jun. 13, 2019

Related U.S. Application Data

(60) Provisional application No. 62/684,532, filed on Jun. 13, 2018.

(51) Int. Cl.
G07C 5/08 (2006.01)
H04W 4/40 (2018.01)
G07C 5/00 (2006.01)

(52) U.S. Cl.
CPC ........... *G07C 5/0808* (2013.01); *G07C 5/008* (2013.01); *G07C 5/0883* (2013.01); *H04W 4/40* (2018.02)

(58) Field of Classification Search
CPC .... G07C 5/0808; G07C 5/0883; G07C 5/008; H04W 4/40
See application file for complete search history.

(56) References Cited

U.S. PATENT DOCUMENTS 6,745,151 B2    6/2004  Marko et al.
9,520,006 B1 *  12/2016 Sankovsky .......... G07C 5/0808
9,830,662 B1 *  11/2017 Baker ................... G06Q 40/08
2009/0207004 A1 * 8/2009 Ziska ................. H04L 63/0853
                                                    340/426.1
2009/0259358 A1  10/2009 Andreasen
2013/0246135 A1   9/2013 Wang
2016/0189447 A1 * 6/2016 Valenzuela ......... G06F 11/3058
                                                      701/29.6
2018/0190043 A1 * 7/2018 Dominic ................ G01C 22/00
2019/0139346 A1 * 5/2019 Tonsing ................. G07C 5/008
2019/0333293 A1 * 10/2019 Lomascolo .......... G07C 5/0808

FOREIGN PATENT DOCUMENTS

WO    2015112813 A1    7/2015
WO    2017024320 A1    2/2017

OTHER PUBLICATIONS

Mahoney S. M., Creating a Wireless OBD-II Scanner, Oct. 2008, Digital WPI (Year: 2008).*

* cited by examiner

*Primary Examiner* — James J Lee
*Assistant Examiner* — Alexander George Matta
(74) *Attorney, Agent, or Firm* — BEKIARES ELIEZER LLP

(57) ABSTRACT

Disclosed herein is a system which may be used for remote vehicle diagnostic and programming. Such a system may provide a high-speed wireless connection between an OBD-II compliant vehicle's OBD-II port and a remote vehicle diagnostic and programming control interface, with connectivity and feature availability rivaling direct wired connections between vehicle and control interface. Such a system may provide benefits in vehicle repair and tuning, remote diagnosis of vehicle issues, fleet management, and improved availability and access to professional vehicle service in remote locations.

20 Claims, 9 Drawing Sheets

REMOTE VEHICLE DIAGNOSTIC AND PROGRAMMING SYSTEM

RELATED APPLICATIONS

Under the provisions of 35 U.S.C. § 119(e), the Applicant claims the benefit of U.S. Provisional Application No. 62/684,532, filed Jun. 13, 2018, which is incorporated herein by reference.

FIELD OF DISCLOSURE

The present disclosure relates to a remote vehicle diagnostic and programming system. More specifically, various embodiments of the present disclosure relate to devices and systems that may connect vehicle diagnostic data sources and programming interfaces with remote vehicle diagnostic equipment.

BACKGROUND

Vehicles today are commonly equipped with an array of onboard sensors and digital systems. Sensors may measure a wide variety of parameters, including the temperature of various fluids (air, oil, fuel, etc.), air pressure, fuel pressure, oxygen, engine speed, knock, exhaust, various voltages, positions of various components (cam, throttle, crank, doors etc.), braking and stability control parameters, seatbelt status, proximity and exterior conditions, and many others. Modern vehicles may sport dozens or hundreds of sensors. Frequently, the digital systems incorporated into vehicles include sophisticated computerized control of various systems—fuel systems, braking systems, engine control systems, airbag systems, lane control systems, and myriad others.

This proliferation of sensors and computing systems means there is often a wealth of data generated during the operation of a vehicle. This data may be accessed from the vehicle's onboard diagnostics (or "OBD"), usually through a standardized port and protocol like OBD-II. A port such as the OBD-II connector may provide physical, wired access to diagnostic data, as well as, sometimes, to adjustable or programmable features of the vehicle's internal computing systems. Accessing a vehicle's OBD is frequently helpful or necessary in diagnosing and repairing issues, making adjustments, assessing and tuning the performance of a vehicle, passing vehicle testing, and many other things that a mechanic, repair center, or enthusiast may want to accomplish with respect to a vehicle.

A large ecosystem of control interfaces has developed to enable user interactions, both simple and complex, with vehicle data systems. Control interfaces may vary from small and inexpensive handheld "readers", to professional scanning and programming units resembling computers, to dedicated computer software. Though widespread and effective, this universe of control interfaces shares a common shortcoming—the requirement for local, wired access to the OBD system is inherently limiting.

Though some systems have been developed that allow for local, wireless connection to OBD systems, and still others have been devised in the realm of remote vehicle diagnostics, it would be advantageous to provide a remote, wireless vehicle diagnostic solution that provides direct access between vehicle data ports and the panoply of existing control interfaces via the already extant ports and protocols they employ. It would also be advantageous to provide a remote, wireless vehicle diagnostic solution with comparable feature availability, data capacity, and speed to a local, wired connection.

In view of at least the above shortcomings, a need exists for a remote vehicle diagnostic and programming system.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Examples described herein include remote vehicle diagnostic and programming systems (the "system" or "systems"). The system may be supplied as one or more hardware dongles that may connect to vehicle diagnostic systems (e.g. via a port such as OBD-II) and to vehicle diagnostic tools (generally, a "control interface"). As an illustrative example, a control interface may be present in an auto mechanic's shop, as a dedicated hardware device (a "scan tool" or "code reader" as a dedicated device) or a computer with OBD software.

The system may facilitate a wireless network connection between a vehicle-side dongle and a control-side dongle that may enable two way communication between the vehicle and the control interface. The system may enable communication in a way that is indistinguishable, or nearly so, from a traditional local wired connection between control interface and vehicle diagnostic systems.

The system may also comprise one or more software applications for managing, pairing, and authenticating diagnostic sessions between vehicle-side dongles and control-side dongles.

One objective of the disclosed system may be to facilitate remote operation of vehicle diagnostic equipment that provides access, functionality, and speed that is comparable to a local wired connection to the vehicle.

Another objective of the disclosed system may be to enable the remote use of common and widespread vehicle diagnostic equipment that otherwise requires a local, wired connection.

Yet another objective of the disclosed system may be to provide a system for securely managing and connecting a plurality of remote diagnostic interfaces.

Still another objective of the disclosed system may be to enable remote management, tuning, diagnostic, and repair operations for a vehicle via a mobile application.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings and their brief descriptions below may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
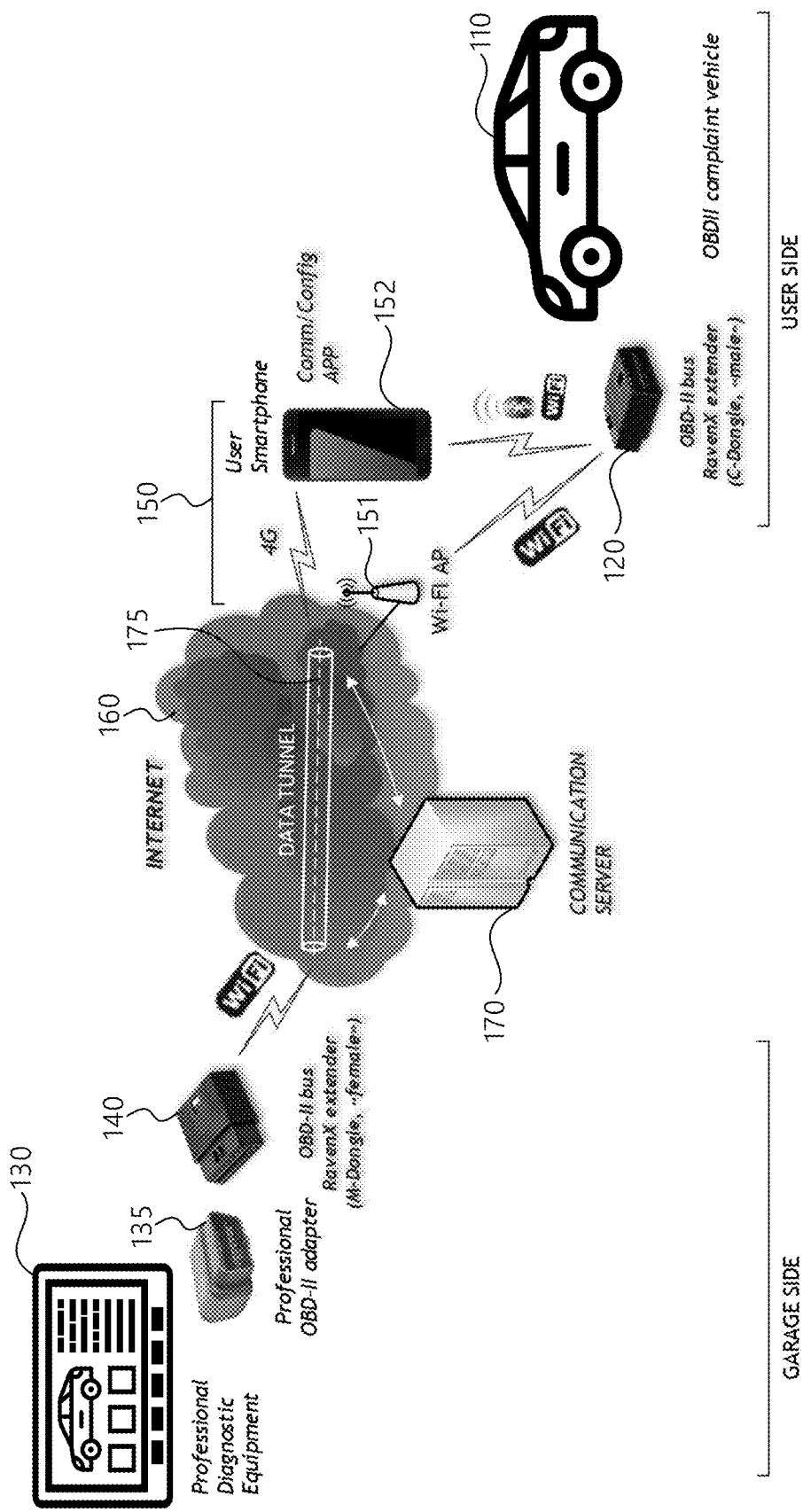
FIG. 1 illustrates a network diagram of a remote vehicle diagnostic and programming system consistent with various embodiments of the present disclosure.
Figure 2:
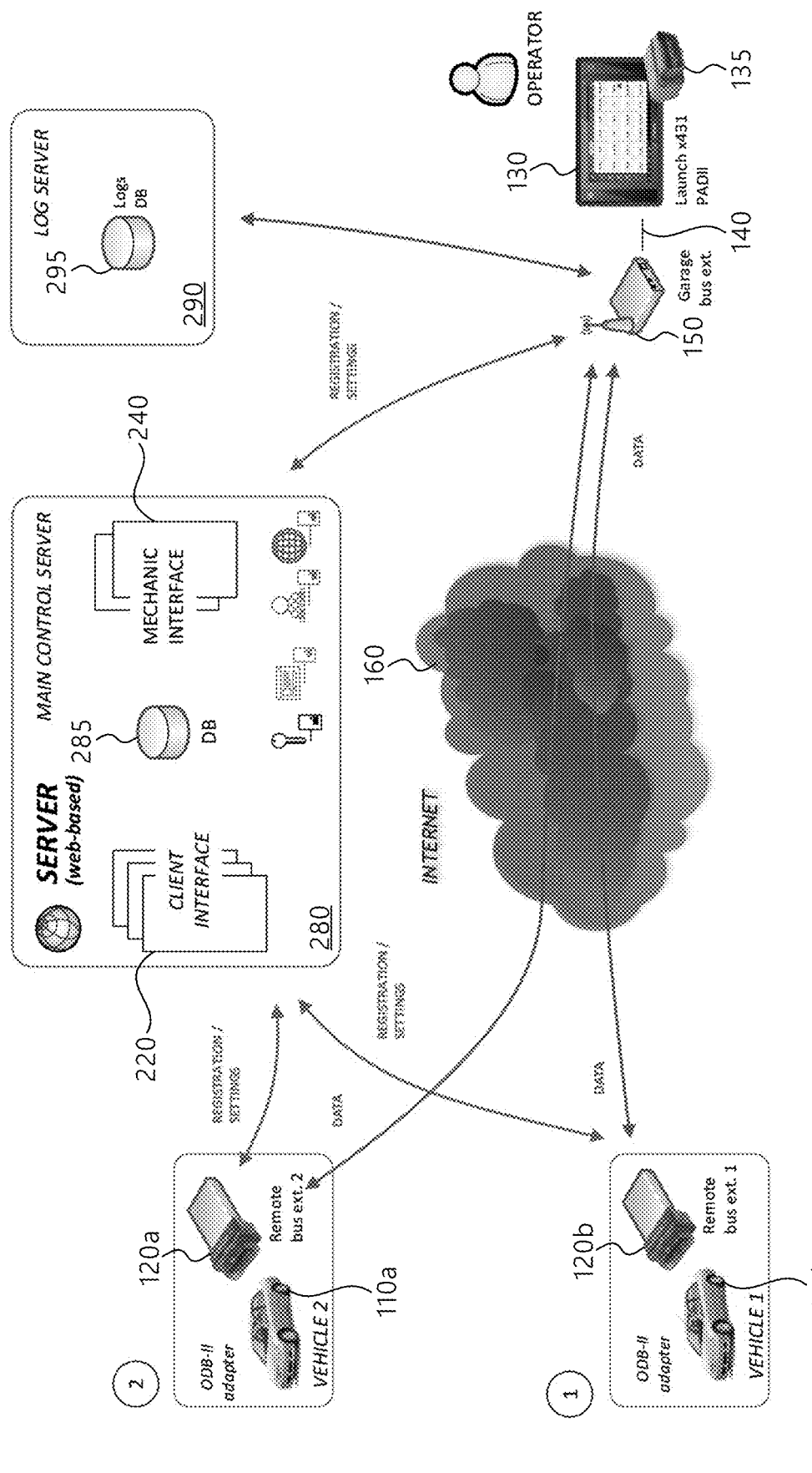
FIG. 2 illustrates another network diagram of a remote vehicle diagnostic and programming system consistent with various embodiments of the present disclosure.
Figure 3:
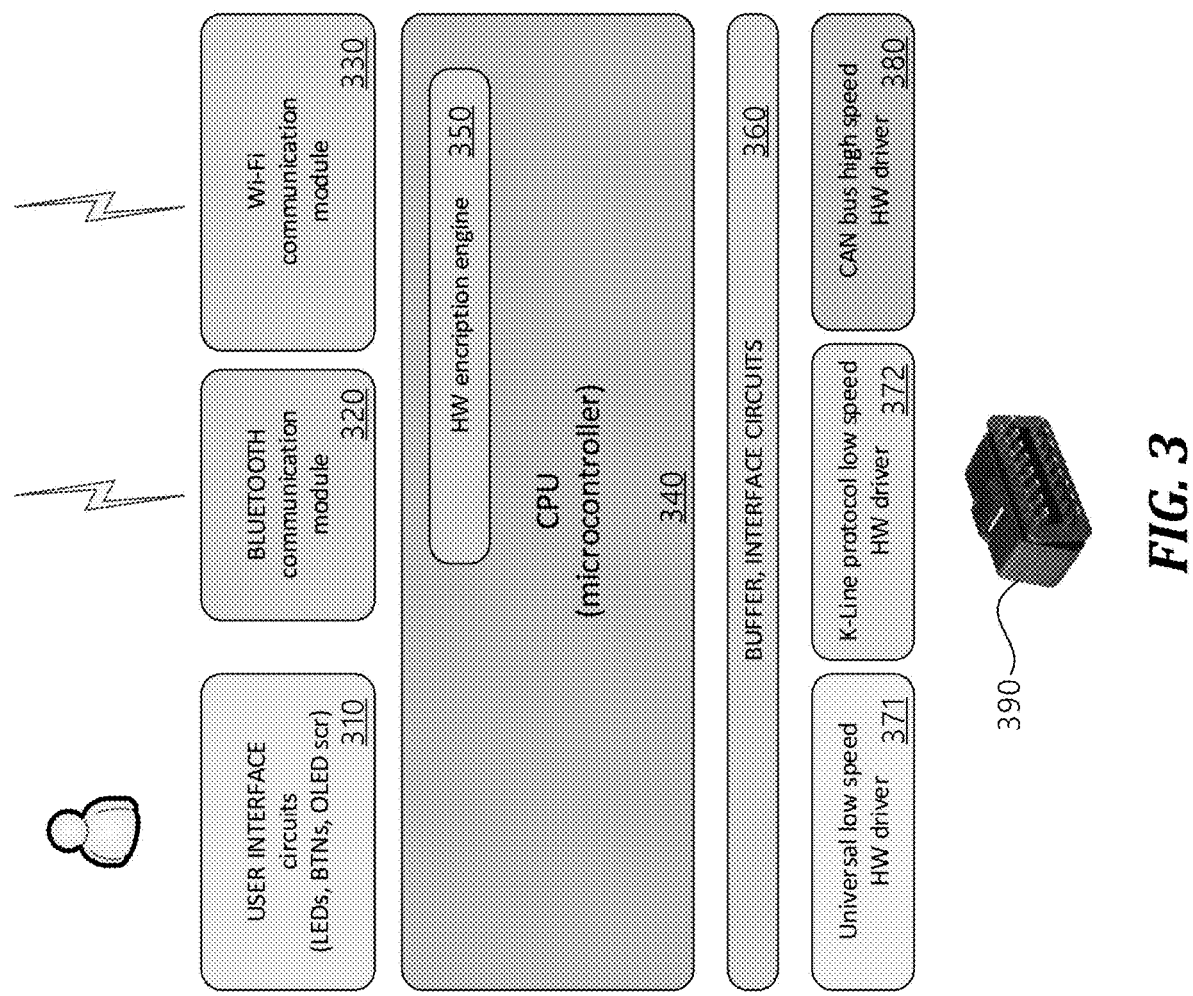
FIG. 3 illustrates a block diagram of a computing unit of a remote vehicle diagnostic and programming system consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of stages of various processes or methods that are described herein are illustrative and not restrictive. Accordingly, it should be understood that, although stages of various processes or methods may be shown and described as being in a sequence or temporal order, the stages of any such processes or methods are not limited to being carried out in any particular sequence or order, absent an indication otherwise. Indeed, the stages in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "stage for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of, embodiments of the present disclosure are not limited to use only in this context.

I. Overview a. Vehicle Diagnostic and Programming System

Consistent with embodiments of the present disclosure, a vehicle diagnostic and programming system (or simply "system") 100 is provided. Referring now to FIGS. 1-4, there are shown various components and features a vehicle diagnostic and programming system 100 may comprise in various embodiments. Some or all of the following components and features may be present in system 100.

b. Vehicle Diagnostic and Programming System

Vehicle 110 may be a motorized vehicle of broad variety, including cars, trucks, buses, motorcycles, off-road vehicles, construction vehicles, tractors, watercraft, aircraft, and any other type of vehicle now extant or future developed (e.g. autonomous vehicles, personal flying craft) having onboard diagnostic capabilities. Though some embodiments described herein reference or imply a traditional automobile, they are not limited thusly.

c. Dongles

Dongles 120, 140 may comprise vehicle-side dongle ("VSD") 120 and control-side dongle ("CSD") 140. Dongles 120, 140 may connect with vehicle OBD systems, via physical port interfaces such as ports 115, 135.

Figure 4:
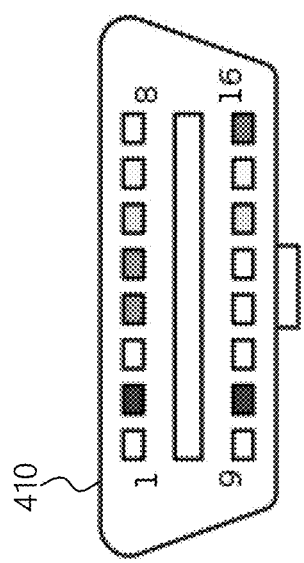
FIG. 4 illustrates a schematic representation of the pin layout of a remote vehicle diagnostic and programming system dongle consistent with various embodiments of the present disclosure.

Dongles 120, 140 may have a pin layout 410 as depicted in FIG. 4. Dongles 120, 140 may operate on (or interoperate with) current standard onboard diagnostic standards (for example, OBD-II and its various signal protocols, SAE J1850 PWM, SAE J1850 VPW, ISO 9141-2, ISO 14230-4, and ISO 15765-4), prior or successor standards that employ one or more physical or otherwise accessible ports, commercial vehicle or proprietary standards, manufacturer diagnostic systems, etc.

In an embodiment, dongles 120, 140 may serve as low-profile OBD-II "extenders"; VSD 120 may be plugged into an OBD-II port and left in place without obstructing the area surrounding the VDP 115, while allowing remote/mobile access by control interface 130 that is "transparent" (i.e. behaves and functions as a wired, local OBD-II connection would).

System 100 may, in some embodiments, allow for remote emission inspection or other vehicle safety or quality testing. Such embodiments may comprise further connectivity between human or automated emissions testers and the area around the vehicle, for example a live video feed or an additional data stream (beyond the connectivity provided between VSD 120 and CSD 140).

d. Wireless Access Point

Wireless access point ("WAP") 150 may provide wireless connectivity to dongles 120, 140, which connectivity may comprise various wireless technologies (e.g. Bluetooth, 2.4 GHz or 5 GHz WiFi, UHF, CDMA, GSM, satellite, laser, optical, IR, sonic, inductive, and other various wireless communication technologies), and may be delivered from a variety of sources, such as WiFi access point 151, through a mobile device 152, via a cellular carrier, or other sources.

In an embodiment, a user's mobile device 152 may act as the WAP 150 for VSD 120 and also provide an authentication mechanism that permits (or denies) access, by control interface 130, to VDP 115. (and thus to the diagnostic data of vehicle 110 and operations thereupon).

e. Ports

Ports 115, 135 may comprise vehicle data port ("VDP") 115 and control interface data port ("CDP") 135. Ports 115, 135 comprise physical data interfaces that are well-known in the art, and are in many instances standards-driven.

f. Control Interface

Control interface 130 may comprise a wide array of OBD-interfacing tools, devices, and systems that are configured to plug directly into a vehicle data port 115. Such systems take many forms, have varying feature sets, and are well-known in the art. In an embodiment, the operation of control interface 130 while connected by system 100 to vehicle 110 may be described as "transparent" in the sense that communications over network 160 utilizing data tunnel 175 provide an operational experience indistinguishable (or nearly so) from a local, wired connection.

g. Communications Server

Communication server 170 may facilitate the establishment of a data tunnel 175 between vehicle-side dongle 120 and control-side dongle 140. Data tunnel 175 may provide a connection with some or all of the following desirous properties for onboard diagnostic communication and functionality between control interface 130 and vehicle 110: real-time interaction, low noise, low latency, high speed, complete OBD feature set, key sync, and vehicle reprogramming capabilities.

One function of communication server 170 may be to coordinate low-level communication protocols between the endpoints. Another function of communication server 170 may be to coordinate high-level interactions between vehicle owners and control-side users, messaging, logging, licensing, and other such activities. Additionally or alternatively, there may be a control server 280 which manages some or all of the high-level functionality. Communication server 170, control server 280, and log server 290 may, but need not, coexist in a single physical, virtual, or cloud server environment.

In some embodiments, data tunnel 175 may be encrypted, and might be established only with the permission of a vehicle owner (or dongle registrant). Data tunnel 175 may utilize TCP/IP packets, and endpoints may have IP addresses.

In an example, communication server 170 may receive a request to establish a secure connection between VSD 120 and CSD 140. Communication server 170 may establish a direct data tunnel 175 between the two endpoints and may (in some embodiments) have no further access to data transferred in the session.

h. Communications Server

Control server 280 may store data regarding, and enable the connections between and management of, a plurality of vehicle and control interface profiles. For example, control server 280 may store registration settings for various dongles 120, 140, information regarding ownership, location, licensure, session history, and various other data and metadata. Control server 280 (as well as other network/communications aspects of system 100) may employ decentralized, virtualized, blockchain, or cloud computing paradigms. Control server 280 and communication server 170 may, but need not, coexist in a single physical, virtual, or cloud server environment.

In an embodiment, control server 280 may receive a request to pair a vehicle-side dongle 120 with a control-side dongle 140. Control server 280 may authenticate the request, and upon successful authentication, may (as an instruction to a separate communication server 170 or as an expression of combined functionality of control 280 and communication 170 servers) mediate the establishment of a data tunnel 175 between VSD 120 and CSD 140. Control server 280 may have the capability of managing or maintaining information regarding a session so established without having any access to the data passed back and forth between control interface 130 and vehicle 110 in the course of the session.

i. Log Server

In an embodiment, system 100 may include a log server 290. Log server 290 may comprise various software and systems, as well as database 295. Log server 290 may record temporal, user, and other information about diagnostic sessions coordinated by control server 280. Control server 280 and log server 290 may, but need not, coexist in a single physical, virtual, or cloud server environment.

II. Software Interface

Figure 5:
FIG. 5 illustrates a set of user interface screens for a remote vehicle diagnostic and programming system consistent with various embodiments of the present disclosure.
Figure 5:
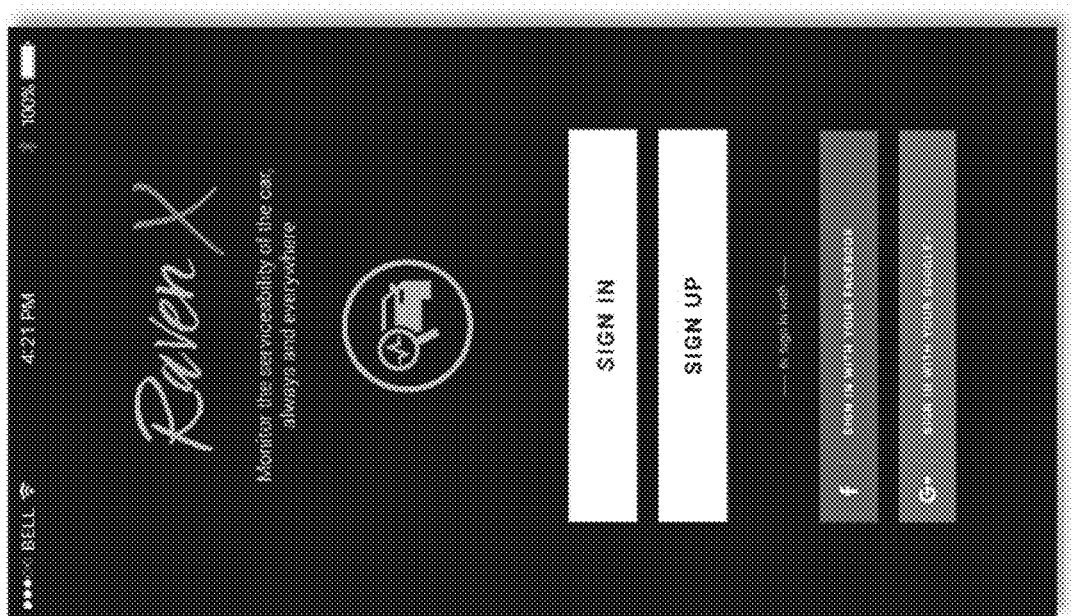
Figure 6:
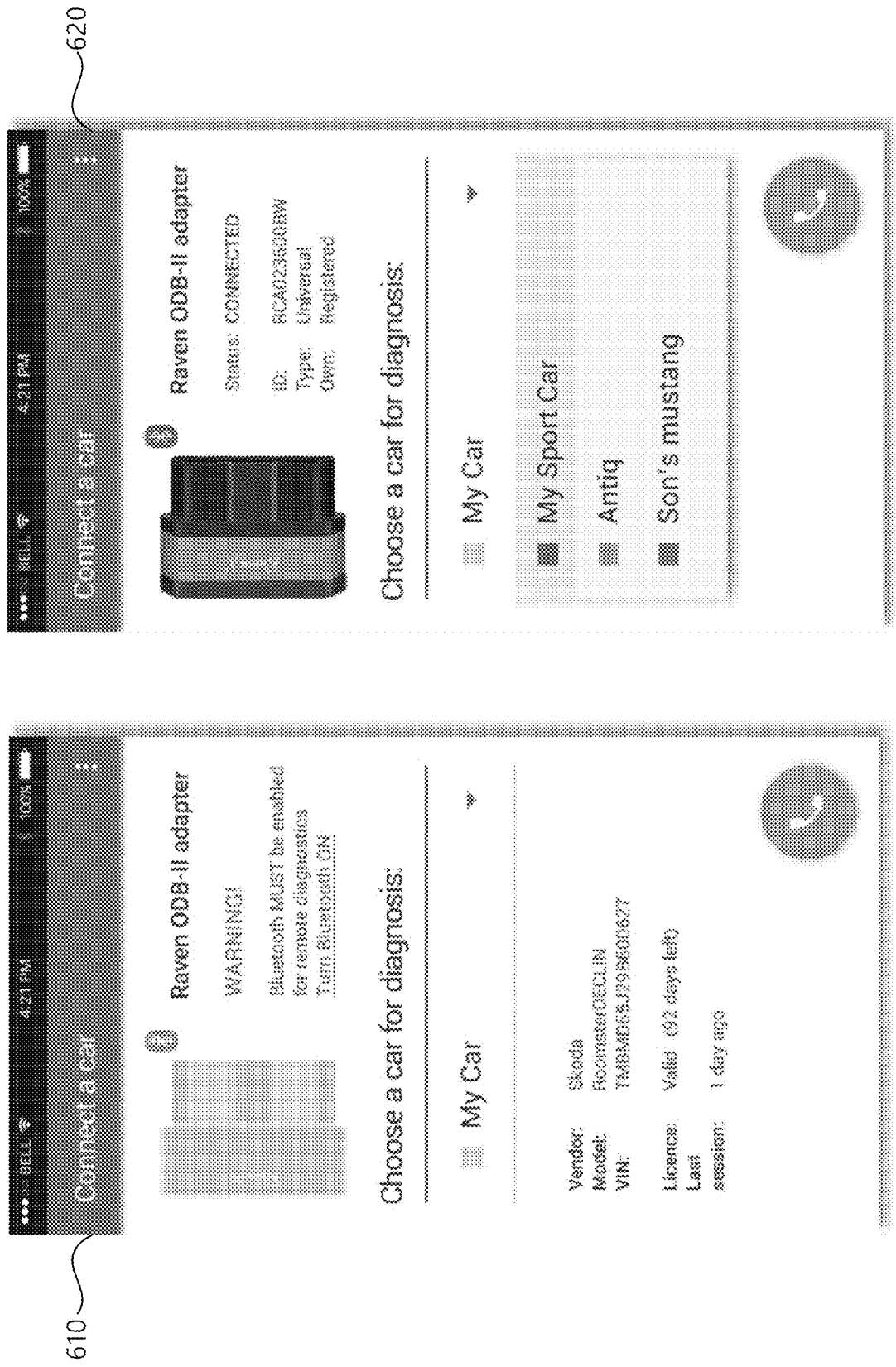
FIG. 6 illustrates another set of user interface screens for a remote vehicle diagnostic and programming system consistent with various embodiments of the present disclosure.
Figure 7:
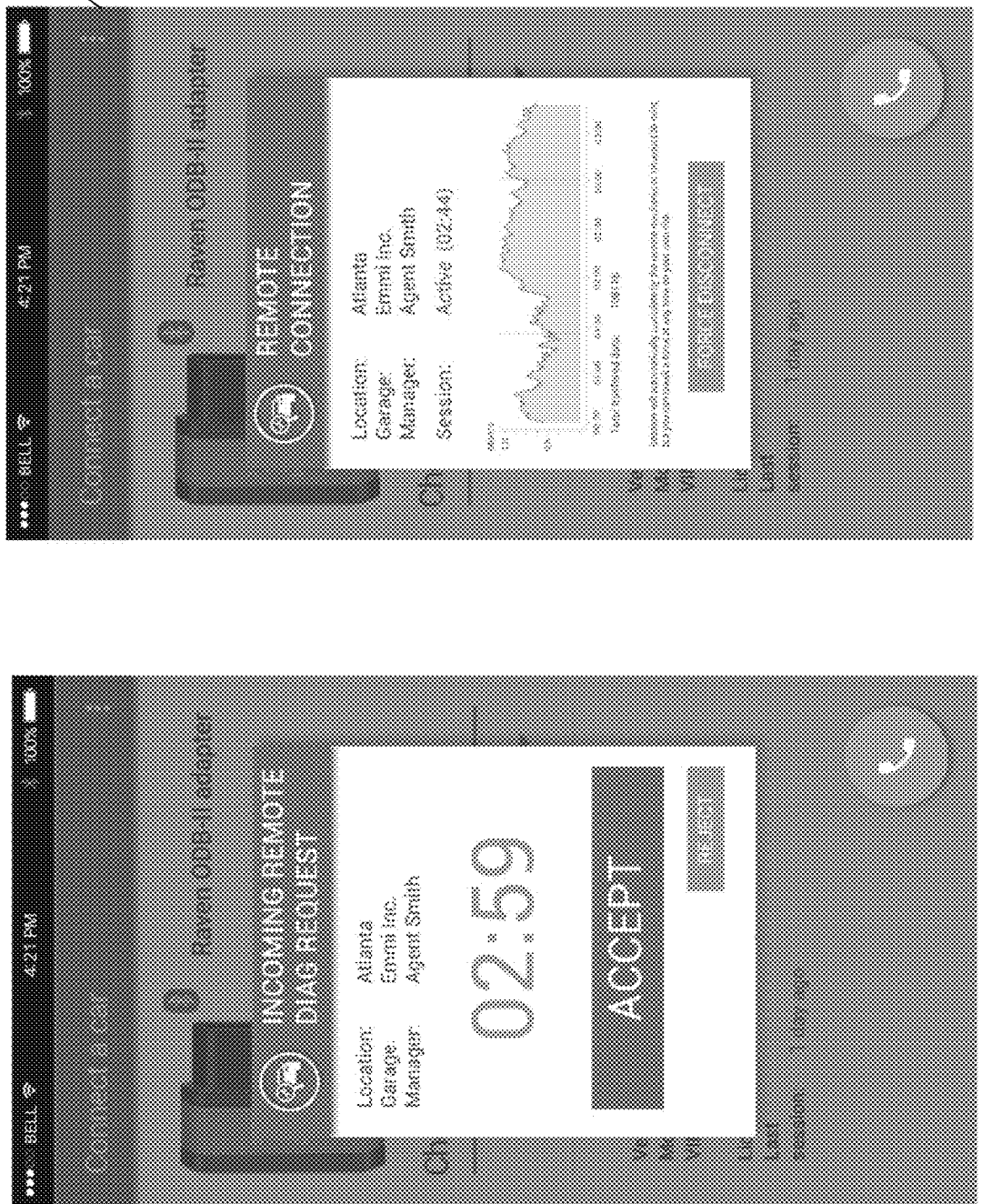
FIG. 7 illustrates yet another set of user interface screens for a remote vehicle diagnostic and programming system consistent with various embodiments of the present disclosure.

Referring now to FIGS. 5-7, there are shown illustrative software interface screens for a mobile device interfacing with system 100 in accordance with various embodiments.

For security and access control purposes, the software interface for system 100 may have the capability of locking (e.g. by passcode or biometrics) a user or the user's device to a particular vehicle 110. Screens 510, 520 show illustrative login screens for a mobile app consistent with embodiments of this disclosure.

Screens 610, 620 show illustrative connection selection/initiation screens whereby a user might choose a vehicle 110 from a list of (labeled) vehicle-side dongles 120 that have been previously connected, and whereby a user may navigate to add or delete vehicles 110 from the list. Screens 610, 620 further illustrate user interface features that allow for (and indeed may prompt) a user to establish a wireless connection for VSD 120 (as in, for example, stage 820 of the method depicted in FIG. 8).

Screens 710, 720 show illustrative connection management/status screens whereby a user might accept incoming connection requests and monitor the status of established connections.

III. Methods of Use

Figure 8:
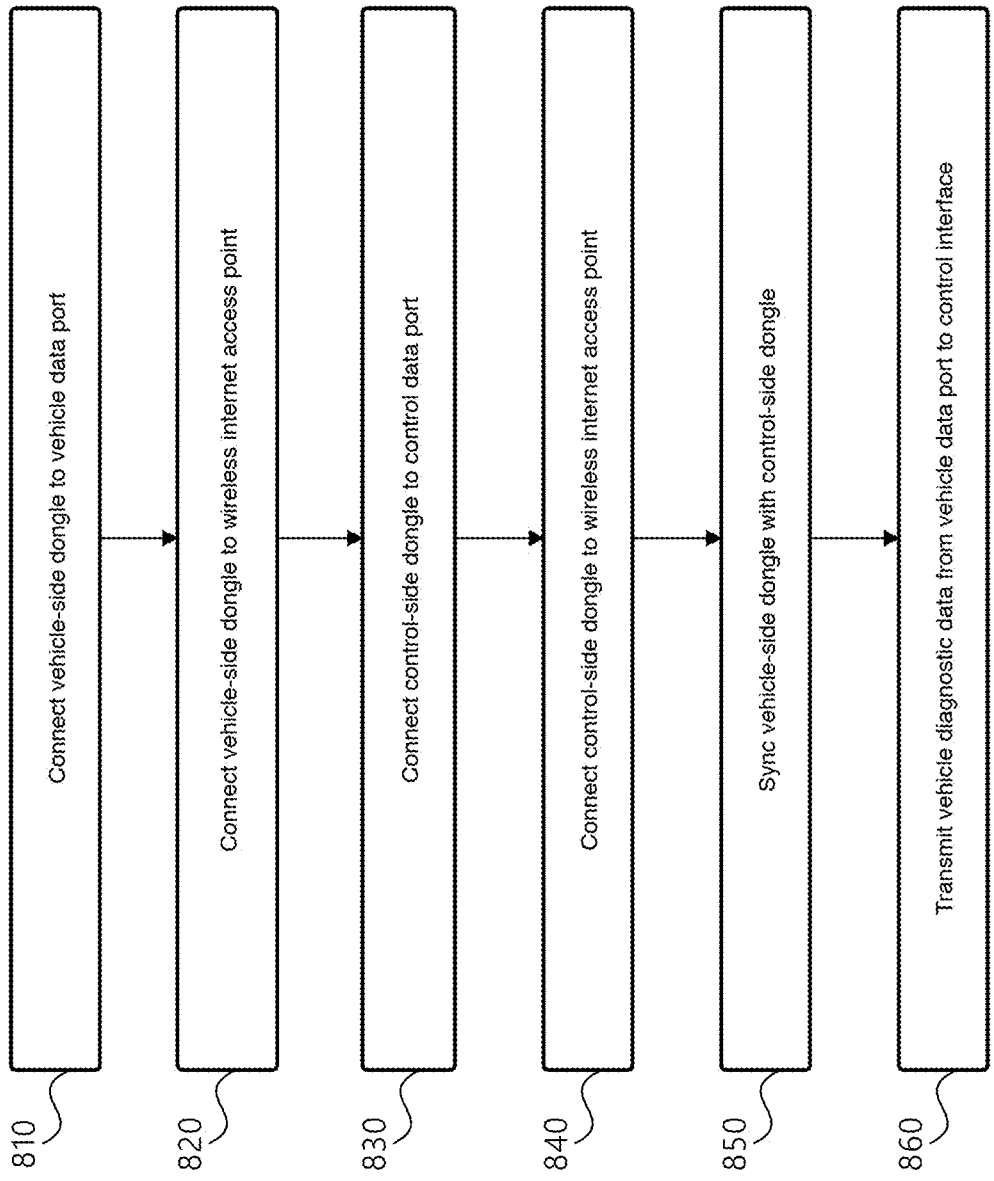
FIG. 8 illustrates a flowchart related to a remote vehicle diagnostic and programming system consistent with various embodiments of the present disclosure.

Referring now to FIG. 8, there is shown an example method 800 for utilizing a vehicle diagnostic and programming system 100 in accordance with various embodiments of the present disclosure.

At stage 810, vehicle-side dongle 120 may be connected to vehicle data port 115. In an embodiment, VSD 120 may be plugged directly into a conforming, OBD-II compliant VDP 115.

At stage 820, vehicle-side dongle 120 may be connected to wireless access point 150. In an embodiment, user mobile device 152 may serve as the WAP 150 for this connection.

At stage 830, control-side dongle 140 may be connected to control data port 135. In an embodiment, CSD 140 may be plugged directly into a conforming, OBD-II compliant CDP 135.

At stage 840, control-side dongle 140 may be connected to a wireless access point 150. In an embodiment, WiFi access point 151 may serve as the WAP 150 for this connection.

At stage 850, VSD 120 may be synced, paired, or otherwise communicatively joined with CSD 140. The network connection between VSD 120 and CSD 140 may be achieved wholly through wireless segments, or in a mix of wired and wireless network segments.

In an embodiment, the transmission may traverse data tunnel 175, which may facilitate real-time communications between control interface 130 and vehicle 110, wherein such communications may have properties including high speed, low signal noise, and feature availability and overall experience on par with a local, wired connection. Communications through data tunnel 175 may be encrypted.

In an embodiment consistent with the above embodiment, communication between vehicle 110 and control interface 130 may be initially established via communication server 170 but conducted entirely through data tunnel 175. In such an embodiment, communication server 170 may not have access to communications sent between VSD 120 and CSD 140 through data tunnel 175.

At stage 860, system 100 may transmit vehicle diagnostic data from vehicle data port 115 to control interface 130 over network 160. Vehicle diagnostic data may comprise various status codes, signals, and indicators. Transmission at stage 860 may comprise instructions to get, set, store, or clear various values, receiving or sending vehicle programming parameters, and continuous monitoring of sensor parameters.

The order of stages presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the invention being indicated by the following claims.

IV. Platform Architecture

Embodiments of system 100 may comprise aspects including, but not limited to, mobile software applications (or "apps"), websites, web applications, desktop software, server software, embedded software, microcontrollers, databases, wired and wireless networking hardware and software, and various computing devices. Moreover, system 100 or aspects thereof may be hosted one or more physical or virtual servers, cloud computing services, blockchain platforms, or distributed computing platforms. Alternatively or in addition, system 100 may be implemented in one or more of a plurality of mobile devices.

Although methods disclosed herein have been described to be performed by a computing device 900, it should be understood that, in some embodiments, different operations may be performed by different networked elements in operative communication with computing device 900. Computing device 900 may comprise, but not be limited to, a desktop computer, a laptop, a server, a dedicated diagnostic device, a touchscreen, a tablet, or a mobile telecommunications device.

Embodiments of the present disclosure may comprise a system having a memory storage and a processing unit. The processing unit coupled to the memory storage, wherein the processing unit is configured to perform the stages of methods disclosed herein.

Figure 9:
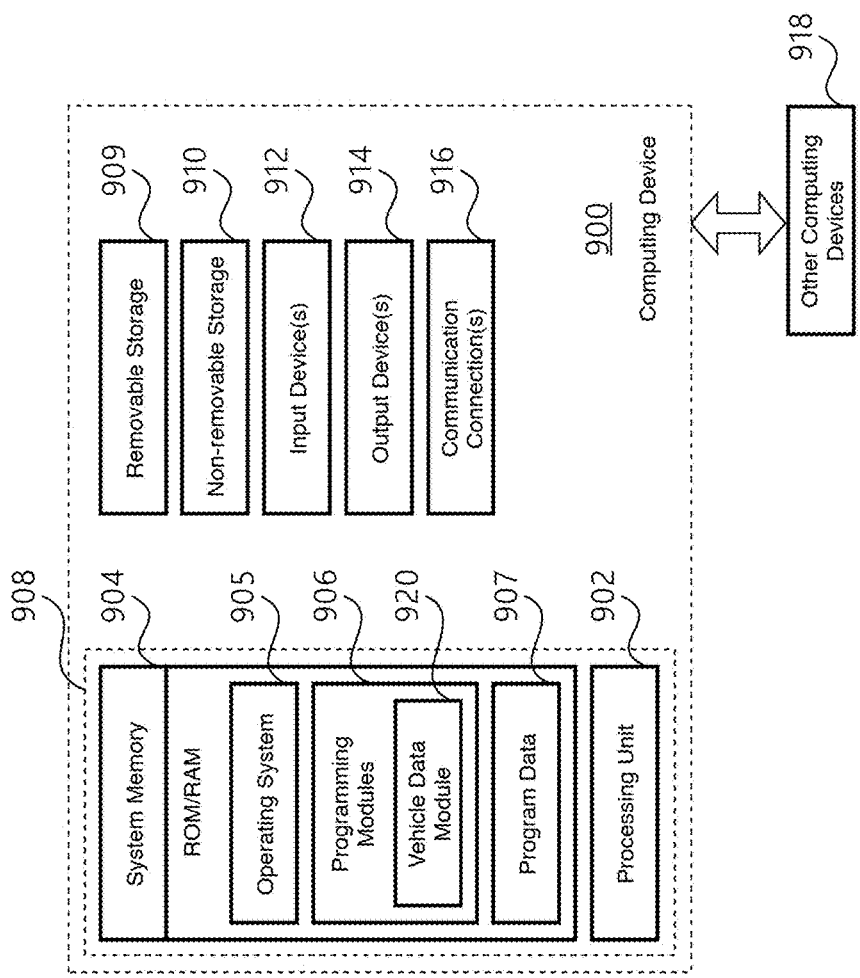
FIG. 9 illustrates a computing platform for a remote vehicle diagnostic and programming system in accordance with various embodiments of the present disclosure.

FIG. 9 illustrates a block diagram of a system including computing device 900. Consistent with an of the disclosure, the aforementioned memory storage and processing unit may be implemented in a computing device, such as computing device 900 of FIG. 9. Any suitable combination of hardware, software, or firmware may be used to implement the memory storage and processing unit. For example, the memory storage and processing unit may be implemented with computing device 900 or any of other computing devices 918, in combination with computing device 900. The aforementioned system, device, and processors are examples and other systems, devices, and processors may comprise the aforementioned memory storage and processing unit, consistent with embodiments of the disclosure.

With reference to FIG. 9, a system consistent with an embodiment of the disclosure may include a computing device, such as computing device 900. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination. System memory 904 may include operating system 905, one or more programming modules 906 (including, for example, vehicle data module 920), and may include a program data 907. Operating system 905, for example, may be suitable for controlling the operation of computing device 900. Features of programming modules 906 may include formatting and displaying information to the user, and formulating and transmitting programming instructions. Furthermore, embodiments of the disclosure may be practiced in conjunction with a graphics library, other operating systems, or any other application program and is not limited to any particular application or system. This basic configuration is illustrated in FIG. 9 by those components within a dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and nonvolatile, removable and non-removable media implemented in any method or technology for storage of information, such as computer readable instructions, data structures, program modules, or other data. System memory 904, removable storage 909, and non-removable storage 910 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a touch input device, a camera, a sensor, etc. Output device(s) 914 such as a display, speakers, a printer, etc. may also be included. The aforementioned devices are examples and others may be used.

Computing device 900 may also contain a communication connection 916 that may allow device 900 to communicate with other computing devices 918, such as over a network in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of programming modules 906 and data files may be stored in system memory 904, including operating system 905. While executing on processing unit 902, programming modules 906 may perform processes including, for example, one or more of method stages as described above. The aforementioned process is an example, and processing unit 902 may perform other processes. Other programming modules 906 that may be used in accordance with embodiments of the present disclosure may include mobile device applications, vehicle programming and vehicle maintenance applications, data visualization applications, authentication applications, OBD-II bus communication applications, network communication applications (including, for example, to facilitate data tunnel 175), database applications, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a vehicle data bus, a portable computer diskette, a random access memory (RAM), a read-only memory (ROM), an erasable programmable read-only memory (EPROM or Flash memory), an optical fiber, and a portable compact disc read-only memory (CD-ROM).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A system for remotely interfacing with vehicle data, the system comprising:
    a vehicle having a data port configured to transmit vehicle data;
    a control interface having a data port configured to receive vehicle data;
    two or more dongles comprising:
        a vehicle-side dongle configured to interface with the data port of the vehicle; and
        a control-side dongle configured to interface with the data port of the control interface; and
    at least one server, wherein the at least one server is configured to establish a secure network connection session between the two or more dongles based on a user accepting, via a user device, a request to establish a connection between the vehicle-side dongle and the control-side dongle, wherein the at least one server manages information regarding the secure network connection session, and wherein the data transmitted over the secure network connection is inaccessible by the at least one server,
    wherein the secure network connection comprises a data tunnel that provides a complete OBD feature set, key sync, and vehicle reprogramming capabilities between the two or more dongles.

2. The system of claim 1, wherein the data tunnel provides a real time connection between the control interface and the vehicle.

3. The system of claim 1, wherein the vehicle is OBD-II compliant and the data port of the vehicle is an OBD-II port, further wherein the control interface is OBD-II compliant and the data port of the control interface is an OBD-II port.

4. The system of claim 3, wherein the system is capable of interoperating with at least one of: SAE 11850 PWM, SAE 11850 VPW, ISO 9141-2, ISO 14230-4, and ISO 15765-4 signal protocols.

5. The system of claim 1, further comprising a user application for a user to authenticate and allow access, from the control interface, to a vehicle associated with the user.

6. The system of claim 5, further comprising a mobile device of the user, wherein the user application is a mobile application on the user's mobile device.

7. The system of claim 1, wherein one or more of the two or more dongles further comprise a wireless network connection between a mobile device of a user and one of the two or more dongles.

8. The system of claim 1, further comprising a control server for managing a plurality of vehicles and control interfaces.

9. The system of claim 8, further comprising a user interface that displays a vehicle maintenance node to manage a plurality of control-side dongles and vehicle-side dongles.

10. A remote vehicle diagnostic and programming system comprising:
    a vehicle-side dongle;
    a control-side dongle; and
    at least one server configured to enable a secure network connection session between the vehicle-side dongle and the control-side dongle that allows direct access based on a user accepting via a user device a request to establish a connection between the vehicle-side dongle and the control-side dongle, by a control interface connected to the control-side dongle, to a vehicle connected to the vehicle-side dongle, wherein the at least one server manages information regarding the secure network connection session, and wherein data transmitted over the secure network connection is inaccessible by the at least one server,
    wherein the secure network connection comprises a data tunnel configured to enable a complete OBD feature set, key sync, and vehicle reprogramming capabilities between the vehicle-side dongle and the control-side dongle facilitated by the at least one server.

11. The system of claim 10, further comprising a control server for managing a plurality of vehicles and control interfaces.

12. The system of claim 11, further comprising a plurality of vehicles and control interfaces, the plurality of vehicles and control interfaces managed by the control server.

13. A method of utilizing a remote vehicle diagnostic and programming system comprising:
    connecting a vehicle-side dongle to a vehicle data port;
    connecting the vehicle-side dongle to a vehicle-side wireless internet access point;
    connecting a control-side dongle to a control-side data port;

connecting the control-side dongle to a control-side wireless internet access point;

establishing a secure connection session between the vehicle-side dongle and the control-side dongle, wherein establishing the secure connection session comprises establishing a data tunnel based on a user accepting via a user device a request to establish the secure connection session between the vehicle-side dongle and the control-side dongle being transmitted to a server, wherein the server manages information regarding the secure connection session and wherein data transmitted over the secure connection is inaccessible by the server, the data tunnel being configured to enable a complete OBD feature set, key sync, and vehicle reprogramming capabilities between the vehicle-side dongle and the control-side dongle;

syncing the vehicle-side dongle to the control-side dongle; and transmitting, from the vehicle data port, vehicle diagnostic data to a control interface.

14. The method of claim 13, wherein the transmitting vehicle diagnostic data provides a real time connection between a control interface and a vehicle.

15. The method of claim 13, wherein the syncing the vehicle-side dongle to the control-side dongle occurs over a network connection comprising a data tunnel that is mediated at least in part by a communication server.

16. The method of claim 13, wherein the vehicle data port and the control interface data port are OBD-II compliant ports.

17. The method of claim 16, wherein at least one of: SAE 11850 PWM, SAE 11850 VPW, ISO 9141-2, ISO 14230-4, and ISO 15765-4 signal protocols is utilized.

18. The method of claim 13, wherein at least one of the vehicle-side wireless internet access point and the control-side internet access point is a user mobile device.

19. The method of claim 13, further comprising providing permission, by a user, through a software application on a device of the user, to access the vehicle data port by the control interface, wherein the providing permission comprises at least one of biometric security feature, passcode, and security token.

20. The method of claim 13, further comprising transmission of vehicle programming data from the control interface to the vehicle data port.

\* \* \* \* \*